United States Patent
Maier et al.

(10) Patent No.: US 11,165,875 B2
(45) Date of Patent: Nov. 2, 2021

(54) METHOD AND SYSTEM FOR A DISCOVERY ENGINE

(71) Applicant: INTERNATIONAL BUSINESS MACHINES CORPORATION, Armonk, NY (US)

(72) Inventors: Albert Maier, Tuebingen (DE); Bernhard Mitschang, Boblingen (DE); Peter Gerstl, Holzgerlingen (DE); Kunjavihari Madhav Kashalikar, Hudson, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/022,374

(22) Filed: Sep. 16, 2020

(65) Prior Publication Data

US 2021/0144218 A1    May 13, 2021

(30) Foreign Application Priority Data

Nov. 12, 2019 (EP) .................................... 19208612

(51) Int. Cl.
  *H04L 29/08* (2006.01)
(52) U.S. Cl.
  CPC .......... *H04L 67/16* (2013.01); *H04L 67/1095* (2013.01); *H04L 67/20* (2013.01); *H04L 67/2814* (2013.01); *H04L 67/2819* (2013.01)
(58) Field of Classification Search
  CPC ..... H04L 67/16; H04L 67/1095; H04L 67/20; H04L 67/2814; H04L 67/2819
  See application file for complete search history.

(56) References Cited

U.S. PATENT DOCUMENTS

| | | |
|---|---|---|
| 9,866,684 B2 | 1/2018 | Eilts |
| 10,073,864 B1 | 9/2018 | Koeten |
| 2005/0267935 A1* | 12/2005 | Gandhi ................. H04L 12/281 709/203 |

(Continued)

OTHER PUBLICATIONS

IBM, "IBM InfoSphere Information Analyzer," IBM.Com, Retrieved from Internet Jul. 20, 2020, https://www.ibm.com/us-en/marketplace/infosphere-information-analyzer, 1 page.

(Continued)

*Primary Examiner* — Minh Chau Nguyen
(74) *Attorney, Agent, or Firm* — David Spalding

(57) ABSTRACT

The present disclosure relates to a method for accessing data of one or more data sources using a discovery engine. The method comprises: determining a discovery space content from initial metadata of a data source indicated in a data exploration request. The discovery space content may be rendered. The rendered content may be used for determining a set of one or more tasks for generating further metadata from at least part of the data of the data source, wherein the set of tasks comprises a combination of API calls. The API calls may be issued to the discovery engine. Discovery results of the issued API calls may be received. A data discovery status may be devalued using the discovery results. The discovery space content may be augmented using the further metadata and the data discovery status. The augmented discovery space content may be rendered for receiving further API calls.

20 Claims, 4 Drawing Sheets

(56) References Cited

U.S. PATENT DOCUMENTS

| 2011/0083126 A1* | 4/2011 | Bhakta ..................... G06F 8/65 717/168 |
| 2016/0092344 A1* | 3/2016 | Bally ................... G06F 11/3684 717/124 |
| 2018/0253477 A1 | 9/2018 | Schoueri |

OTHER PUBLICATIONS

IBM, "IBM InfoSphere Information Governance Catalog," IBM. Com, Retrieved from Internet Jul. 20, 2020, https://www.ibm.com/us-en/marketplace/information-governance-catalog, 1 page.

ODPI, "ODPi Creates Open Source Standards to Help You Use and Understand Data Across All Platforms," ODPi.Com, Retrieved from Internet Jul. 20, 2020, https://www.odpi.org/, 1 page.

Tamr, "Tamr.com—Data Can Help Drive Better Business Outcomes Faster," Retrieved from Internet Jul. 20, 2020, https://www.tamr.com/, 5 pages.

Trifacta, "Get Your Data Ready for Machine Learning & Analytics in the Cloud," Trifacta.com, Retrieved from Internet Jul. 20, 2020, https://www.trifacta.com/, 5 pages.

\* cited by examiner

METHOD AND SYSTEM FOR A DISCOVERY ENGINE

BACKGROUND

The present invention relates to the field of digital computer systems, and more specifically, to a method for accessing data of one or more data sources using a discovery engine.

In the context of digital transformation, many users are confronted with large numbers of voluminous data sets from various data sources ranging from structured data as in case of database tables to unstructured data as in files representing transcripts or e-mails. All that data is to be organized and investigated in order to understand the information content and to assess value, further usages and gains of the data. Tools and systems have been built to help in this, like profiling tools. However, these tools provide many discovered data characteristics that all must be properly organized ad-hoc by a discovery user.

SUMMARY

Various embodiments provide a method for accessing data of one or more data sources using a discovery engine, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for accessing data of one or more data sources using a discovery engine, the discovery engine providing application programming interfaces, APIs, for processing data of the data sources. The method comprises: (a) receiving a data exploration request indicative of a data source; (b) determining initial metadata descriptive of properties of data of the data source; (c) determining a discovery space content from the initial metadata, the discovery space content comprising values of predefined discovery attributes, the discovery attributes comprising at least semantic attributes representing semantic information of data and attributes describing a type and amount of data; (d) rendering the discovery space content; (e) using the rendered content for determining a set of one or more tasks for generating further metadata from at least part of the data of the data source in accordance with the data exploration request, where the set of tasks comprises a combination of API calls of the APIs; (f) issuing the API calls of the set of tasks; (g) receiving discovery results of the issued API calls, the discovery results comprising further metadata of the data of the data source; (h) evaluating a data discovery status using the discovery results, the data discovery status indicating at least an amount of data that fulfills the data exploration request; (i) augmenting the discovery space content using the further metadata and the data discovery status; and (j) repeating steps (d) to (i) until the data discovery status fulfills a discovery stopping criterion.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for accessing data of one or more data sources using a discovery engine, the discovery engine providing application programming interfaces, APIs, for processing data of the data sources. The computer system is configured for: (a) receiving a data exploration request indicative of a data source; (b) determining initial metadata descriptive of properties of data of the data source; (c) determining a discovery space content from the initial metadata, the discovery space content comprising values of predefined discovery attributes, the discovery attributes comprising at least semantic attributes representing semantic information of data and attributes describing a type and amount of data; (d) rendering the discovery space content; (e) using the rendered content for determining a set of one or more tasks for generating further metadata from at least part of the data of the data source in accordance with the data exploration request, where the set of tasks comprises a combination of API calls of the APIs; (f) issuing the API calls of the set of tasks; (g) receiving discovery results of the issued API calls, the discovery results comprising further metadata of the data of the data source; (h) evaluating a data discovery status using the discovery results, the data discovery status indicating at least an amount of data that fulfills the data exploration request; (i) augmenting the discovery space content using the further metadata and the data discovery status; and (j) repeating steps (d) to (i) until the data discovery status fulfills a discovery stopping criterion.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
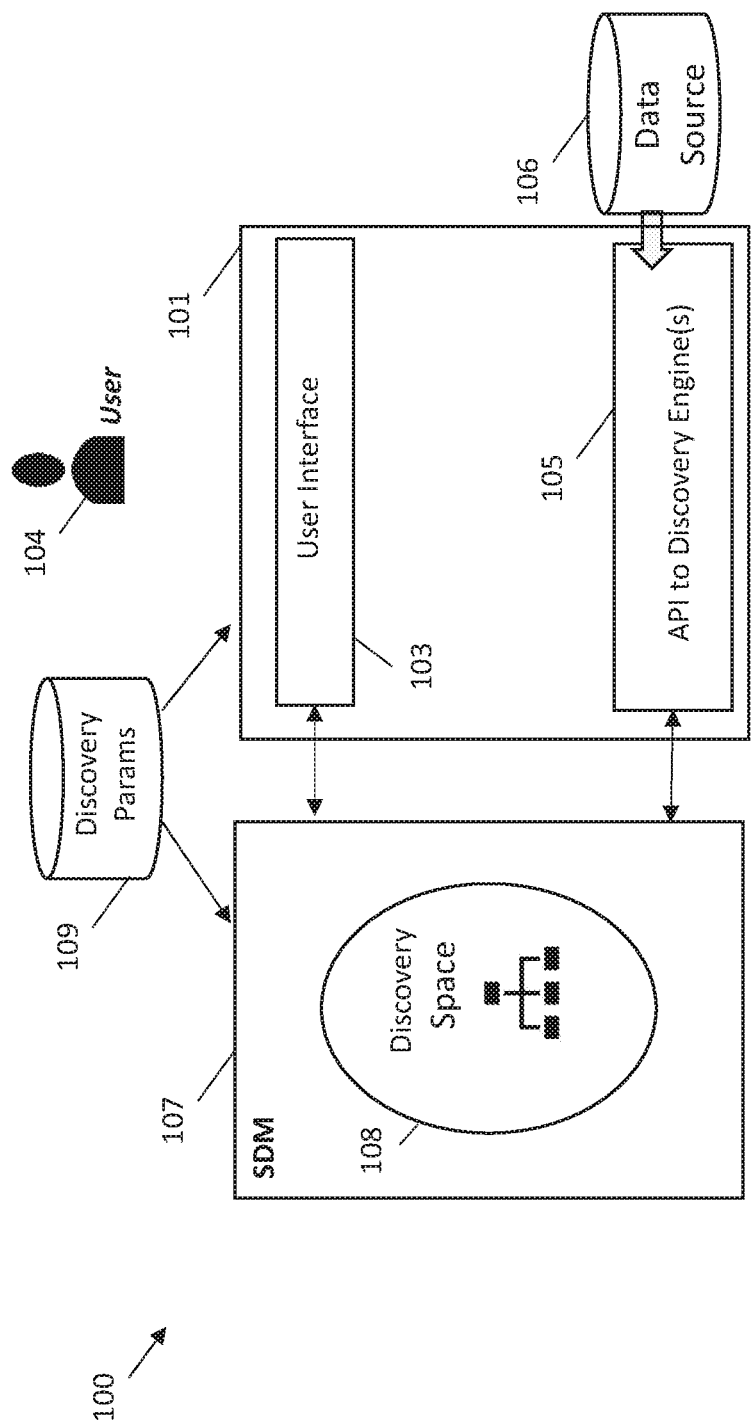
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The discovery engine enables a user to discover data manually. That is, the discovery engine may be used to perform a discovery process that is manual and user-driven with no system support. The user uses the discovery engine to access a given data source and to discover the data characteristics of the given data source. The user may be the only responsible party to take care on an overall discovery strategy, executed discovery steps, as well as the overall goal focus. In addition, the user may be responsible for the time and resources involved in the discovery process. However, this can result in performance issues. For example, this manual method may result in issuing a sheer amount of API calls, a large part of which may be unnecessary. The manual method may involve high-cost resources and may not scale with increasing data. Due to the high combinatorial number of alternatives to work through the data, the user may not exploit the best strategy. For example, with the manual method, unimportant data files may be investigated first before important data files leading to a waste of system resources and time. The present subject matter may solve these issues.

The present subject matter may enable to obtain automatically insights from data sources, and to prompt reaction to them. The instantaneous reaction may be advantageous as it may speed up the discovery process. This may enable the user to take decisions in time. This may particularly be advantageous as time-to-value and result qualities may be important factors, e.g., when locating sensitive information prior to populating a data lake. Areas such as financial fraud detection and algorithmic trading may thus benefit from the present subject matter.

The present subject matter may actively help the user to do the task in a timely manner, not to forget important activities, not to waste resources and to guide the user to directly get the important results. This may save processing resources that would otherwise be required by repeated unnecessary attempts to access data by the user using the manual method. Thus, the present subject matter provides support and guidance to the user optimizing involved resources and maximizing the volume and quality of discovered results with respect to the discovery goals.

The present subject matter may enable to discover data in a gradual mode. The gradual mode breaks down the discovery process into steps so that important information and results are first provided to help taking a decision on the further discovery strategy.

According to one embodiment, the determining of the set of tasks comprises anyone of: receiving user selected API calls, automatically selecting API calls, wherein the combination of the API calls comprises the user selected API calls and/or automatically selected API calls. This embodiment may enable a data-driven exploration in combination to a user-driven exploration. This may morph the manual method, where the user has to decide on each and every discovery task, to a method where the user gets a valuable support, as well as guidance and recommendations.

According to one embodiment, the method further comprises: providing a pool of strategies in association with data descriptive metadata, each strategy of the strategies comprising API calls, performing the automatic selection by querying the pool using the rendered discovery space content. The pool may enable a centralized, consistent and efficient source of strategies that can be used for different discovery engines and for different data sources. The pool may be an efficient source because the strategies of the pool may be a result of an intense investigation and proof of practical relevance e.g. a chosen strategy of the pool has a very high probability to be the right one.

Each strategy of the pool may indicate a method for generating metadata from data of data sources. For example, a strategy of the pool may be a topic-based strategy for generating from the data source information on sensitive content, personally identifiable information (PII) content, customer churn etc. However, if it is not optimized, the generation of the metadata may affect the performance of the system. For that, each strategy of the strategies of the pool may further indicate data access strategies.

In one example, a strategy of the pool may comprise a data search strategy that is suitable and/or optimal for a specific type of data. The data search strategy may for example require a breadth-first search for tree-based data structures. The data descriptive metadata associated with this strategy may indicate a tree or graph data structure.

In another example, a strategy of the pool may comprise a data volume-based strategy. The data volume-based strategy may for example require processing the data in a given order based on its volume. For example, small volume data may first be processed before processing large volume data. This may save processing resources as it may avoid processing large datasets e.g. if the discovery stopping criterion is fulfilled at an early stage of the data processing. In another example, homogenous volumes of data may first be processed before processing inhomogeneous volumes of data.

In another example, a strategy of the pool may comprise a quality-based strategy. The quality-based strategy may require processing data with the highest quality first before processing the data with the lowest quality.

In another example, a strategy of the pool may comprise a schema-based strategy. The schema-based strategy may require processing of a certain type of data such as the table or column schema only.

According to one embodiment, the data descriptive metadata comprises a fraction of tables that have metadata, structure of the data and a number of types of metadata.

The fraction of tables may indicate the presence of rich metadata or sparse metadata. The rich metadata may indicate that more than 90% of tables of the data source do have a non-empty description field. Sparse metadata may indicate that less than 10% of tables do have a non-empty description field. The structure of the data may indicate the number of columns and rows in each table of the data of the data source. And, the number of types of metadata may indicate how heterogenous the metadata is.

In one example, in the presence of rich metadata, a corresponding selected strategy of the pool may involve machine learning (ML) based term assignment algorithms only. In addition, the strategy may require that only 5% of the un-investigated tables, having the smallest number of columns, can be used for determining term assignments. This may be advantageous as only a portion of the tables of the data source may be relevant for a discovery goal as defined by the data exploration request.

In another example, in the presence of sparse metadata and a significant number of small tables, a corresponding selected strategy of the pool may use data classification algorithms only. A small table may, for example, be a table having less than 15 columns and less than 100,000 rows.

According to one embodiment, determining the initial metadata comprises: gathering existing metadata of the data source from catalogs of the data source, and/or performing one or more metadata generation methods on the data of the data source.

This embodiment may enable a gathering phase that provides all initially available metadata. The gathering may comprise harvesting all database catalogs data of the data source by issuing a sequence of corresponding calls to the API of the discovery engine. A database catalog of the database catalogs may consist of metadata in which definitions of database objects such as base tables, views, synonyms, value ranges, indexes, users, and user groups are stored.

In one example, an initial metering/scoring can be done in the gathering phase, e.g., right at the beginning of the discovery process and will be further refreshed during an enrichment phase. For example, the data discovery status may be evaluated already at the gathering phase. This may be advantageous for example in case the discovery cannot be performed at all e.g. because the data (itself) of the data source may not be accessible if it is encrypted etc. This may save processing resources that would otherwise be required by an unnecessary enrichment phase.

According to one embodiment, the metadata generation methods comprise a shallow profiling, shallow domain recognition and/or shallow data quality analysis. This may further increase the initial metadata. The more metadata initially provided, the more accurate the selected discovery strategy. This may prevent unnecessary attempted strategies.

According to one embodiment, the stopping criterion requires one of: the amount of data being smaller than a predefined minimum threshold, and the amount of data being larger than a predefined maximum threshold.

For example, the data exploration request may require data for a churn analysis. In this case, the stopping criterion may be fulfilled if the term assignments to selected tables and columns (of the at least part of the data) does not result in a single churn-associated term e.g. the user may decide to stop the discovery and to conclude that there is no customer churn related data available. In another example, if the number of churn-associated terms is large enough, the user may decide to stop the discovery as he/she has enough data for performing the churn analysis.

According to one embodiment, the data discovery status is evaluated using a number of distinct data types of data that fulfill the data exploration request. The stopping criterion requires one of: the number of distinct data types is smaller than a predefined minimum number; and the number of distinct data types is higher than a predefined maximum number.

These embodiments may provide a metering/scoring functionality for the strategies being used for data discovery. Data support for the evaluation of the metering/scoring functions may be provided by the discovery engine.

According to one embodiment, the method is performed by a discovery manager that is connected to the discovery engine, wherein the rendering is performed on a user interface of the discovery manager, wherein the data exploration request is received at a user interface of the discovery engine.

According to one embodiment, the rendering of the discovery space content comprises rendering a progress bar indicative of the data discovery status.

According to one embodiment, the method further comprises in case the discovery stopping criterion is fulfilled retrieving data that fulfills the data exploration request at a local system and processing the retrieved data at the local system. For example, this data may be published in a knowledge catalog. This embodiment may save processing resources such as storage and CPU since only relevant data is used locally.

FIG. 1 is a block diagram of a computer system 100 in accordance with an example of the present subject matter.

The computer system 100 may comprise a discovery engine 101. The discovery engine 101 provides means for enabling a discovery analysis. The discovery engine 101 may be configured to receive data exploration requests from a user 104 at a user interface 103. The discovery engine 101 may provide one or more APIs 105. The APIs may receive API calls of software components willing to interact with the discovery engine 101. The discovery engine 101 is configured to process data of one or more data sources 106 upon receiving an API call. The data of the data source 106 may include structured data, unstructured data, or a combination thereof. Structured data may be based on data structures including, without limitation, an array, a record, a relational database table, a linked list, or other types of data structures. The data source 106 may include for example a public or private cloud storage system, a URL or web-based data source, or any other accessible data source.

The computer system 100 may further comprise a discovery manager 107. The discovery manager 107 may be referred to as a smart discovery manager (SDM). The discovery manager 107 may be configured for discovering the contents of the data source 106, in accordance with the present subject matter, by using the discovery engine 101. The discovery manager 107 may be configured to perform at least part of the method as described herein. The discovery manager 107 may be operatively coupled to the discovery engine 101.

The discovery manager 107 provides support and guidance to the user 104 for optimizing involved resources and maximizing the value of discovered results. For that, the discovery manager 107 may be configured to receive requests destined to the discovery engine 101 and that are received at the user interface 103. The requests received at the user interface 103 may be redirected to the discovery manager 107. The discovery manager 107 may be configured to issue API calls via the API 105 of the discovery engine 101. The discovery manager 107 may exploit the API of the discovery engine 101 to issue discovery tasks on behalf of the user 104.

The discovery manager 107 comprises a discovery space 108. The discovery space 108 may for example comprise a storage and a user interface. The discovery space 108 may be used as an integration point for a discovery process. For example, during the discovery process, the discovery manager 107 may store and represent discovery results in the discovery space 108. The discovery space may provide visualization, search, and navigation capabilities. The discovery manager 107 may thus enable the user 104 to properly work with the discovery space 108 and to deliver the discovery results to the discovery space 108 in order to get visualized to the user.

The computer system 100 further comprises discovery parameters 109. The discovery parameters 109 may enable the user 104 to specify data exploration requests. For example, the discovery parameters 109 may comprise a set of goal terms such as 'customer churn' as well as data sources to be discovered.

Although shown as separate components, the discovery manager 107 and the discovery engine 101 may, in one example, be collocated components, e.g., the discovery engine 101 may comprise the discovery manager 107.

The computer system 100 may be advantageous as the discovery manager 107 enables an independence from the underlying discovery engine 101. For example, the discovery manager 107 may enable a user-centered visualization of the discovery space 108 and its semantic information independent from the given user interface 103.

Figure 2:
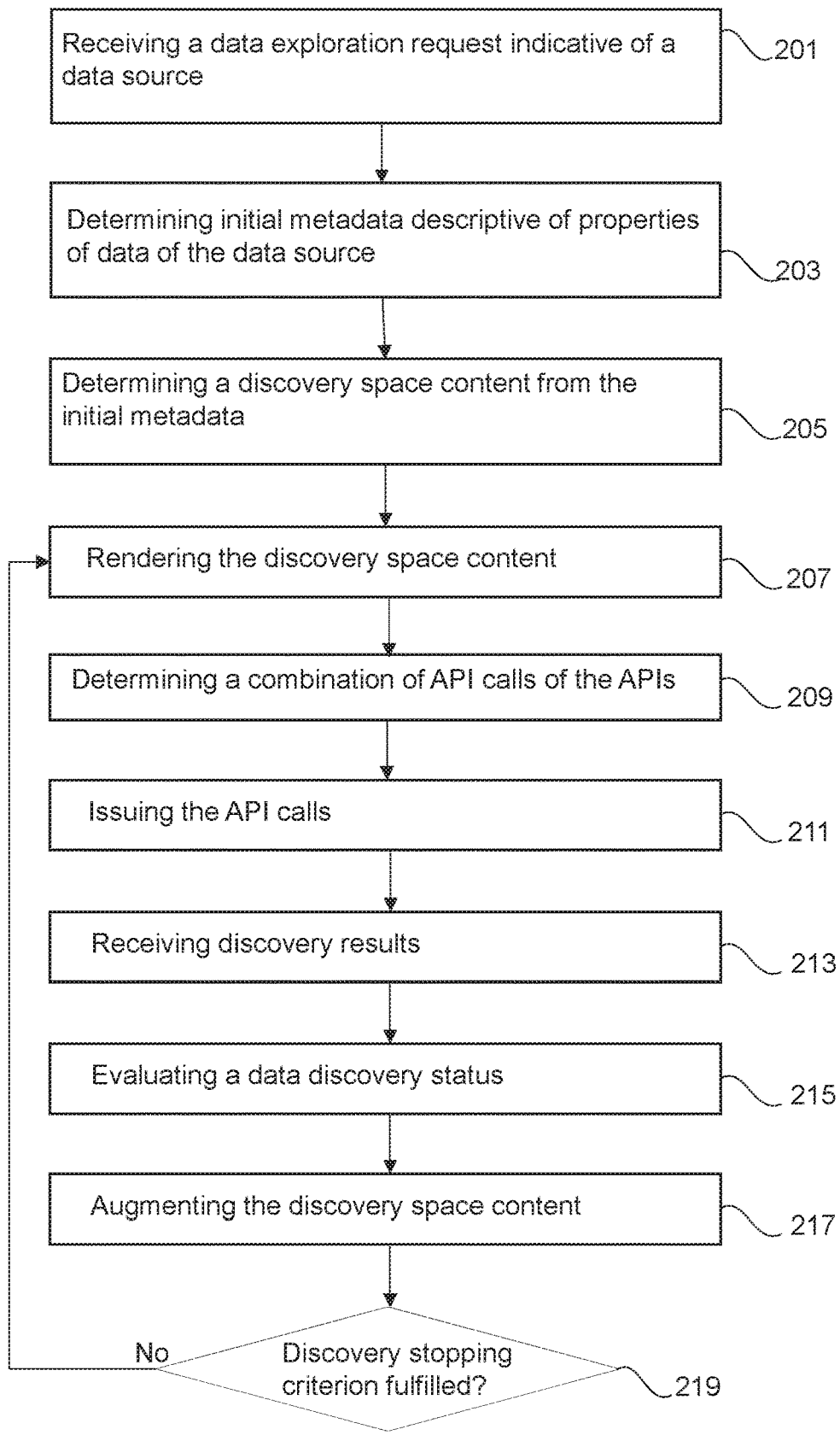
FIG. 2 is a flowchart of a method for accessing data of one or more data sources using a discovery engine in accordance with an example of the present subject matter.

FIG. 2 is a flowchart of a method for accessing data of one or more data sources using a discovery engine, e.g., discovery engine 101. The method of FIG. 2 may for example be performed by a discovery manager, e.g., discovery manager 107. The discovery manager may be part of the discovery engine. In another example, the discovery manager may be configured to remotely connect to the discovery engine. The discovery engine provides an API for processing data of the data sources. For example, the data sources comprise many data sets that in turn consist of separate data containers like files or tables. The data of the data sources may comprise structured data and/or unstructured data.

A data exploration request indicative of a data source may be received by the discovery manager 107 in step 201. For example, the discovery engine 101 may comprise a first user interface 103, wherein the data exploration request is received from a user via the first user interface. The data exploration request may comprise values of predefined parameters. The parameters may represent a discovery goal as well as the data source, its data sets and data containers to be discovered.

The discovery goal may be selected by the user from a set of predefined supported goals, e.g., discovery parameters 109. For example, the goals may be organized (e.g., on the first user interface) in a list, network or hierarchy to express their relationships. This may enable a simplified data exploration request definition by the user. The discovery goal may express an organization's interest in the data. The discovery goal may for example be labeled as "All" indicating that all data containers of the data source are to be investigated and to discover all metadata enrichments of the discovery engine. In another example, the discovery goal may be labeled "Sensitive data" indicating that the user is primarily interested in discovering sensitive data, e.g., PII data. In another example, the discovery goal may require a preparation of metadata for data lake consumption, e.g., driven by a data scientist's goal to look for data that allows the data scientist to analyze customer churn.

For simplification of the description, the present method may be described in accordance with a churn analysis example. For example, the data exploration request may require exploring data for a customer churn analysis. The data exploration request may indicate a big data source comprising 50 schema/databases (D1 to D50) with 100,000 tables (T1 to T100000). Each database or table may be referred to as a data item.

An initial metadata descriptive of properties of data of the data source may be determined in step 203. Step 203 may be performed in response to receiving the data exploration request. This may provide data on-demand and thus may save processing resources that would otherwise be required by an unnecessary determination of the initial metadata. In another example, step 203 may be performed regardless of the reception of the data exploration request, e.g., step 203 may be performed offline. This may speed up the present method as the initial metadata may be ready for use at the time of executing the method.

Step 203 may be referred to as a gathering phase. During the gathering phase, all database catalog data may be harvested by issuing a sequence of corresponding calls to the API of the discovery engine. This may result in receiving the initial metadata descriptive of the data of the data source. Following the churn analysis example, the initial metadata may be determined for the 50 databases and the 100,000 tables by, for example, querying a catalog associated with the big data source.

The initial metadata of each data item of the data source may indicate general properties of the data item. For example, the metadata may comprise characterizing attributes such as a name and textual description of the data item. The initial metadata may further indicate the provenance of the data item. For example, the characterizing attributes may indicate an owner, location, access privileges and last accessed feature of the data item. The initial metadata of each data item may further indicate profile data that may result from a profiling analysis of the data item. In this case, the characterizing attributes may indicate a value distribution, percentage of filled/empty columns and/or quality scores of the data item.

Step 203 may be advantageous as it may make use of existing infrastructures in order to obtain already computed metadata. This may save processing resources that would otherwise be required for determining from scratch the initial metadata.

A discovery space content may be determined in step 205 from the initial metadata. The discovery space content is a data content. The discovery space content comprises values of predefined discovery attributes. The discovery attributes comprise at least one of semantic attributes representing semantic information of data and attributes describing a type and amount of data. The semantic information may enable an understanding of the meanings (semantics) of a computational content (e.g. text, data) and express them in a machine-processable format. For example, for each discovery attribute of the discovery attributes, the initial metadata may be analyzed in order to identify or generate a value of the discovery attribute. If a value cannot be determined for a given discovery attribute, an empty value or dummy value may be assigned to the given discovery attribute.

The discovery space content may further comprise the characterizing attributes of the initial metadata. This may yield a representation of each and every data item of the data source. For example, using the characterizing attributes, the discovery space content may be determined so that it comprises a representation of a data source (e.g., product/supplier/customer data of company A1) mostly consisting of data sets (databases, e.g., database A1-customer, database A1-supplier, database A1-product) of data containers (e.g. files and tables, for instance tables A1-supplier-Address, A1-supplier-history, A1-supplier-supplied product, A1-supplier-area, etc.).

The discovery space content may further represent additional data sources which are not referred to in the data exploration request. This may yield a representation of both sources that do have discovery goal matches as well as those that do not have discovery goal matches. This may be used to better determine a next discovery step and scope.

The discovery space content may be advantageous as it may provide a systematic, unified and consistent approach for representing data. The discovery space content may be organized in the same way for different data sources. For example, the discovery manager may be configured to create or determine the discovery space content for different data sources, e.g., having different formats of metadata. The present method may be transparent to the user in that the user would get consistent and same representations for different data sources.

Following the churn analysis example, the discovery space content may be initialized with the available data items (the 50 databases and the 100,000 tables) and their metadata. However, this amount of data items may be too large to oversee. For that, the present method may provide additional metadata to achieve a better state for separating the interesting items from the non-interesting ones.

The discovery space content may be rendered or displayed in step 207. For example, the discovery space content may be displayed in a discovery space. The discovery space 108 may, for example, comprise a second user interface (not shown in the Figures) of the discovery manager 107. By contrast to the first user interface 103, step 207 may massively extend the content of the second user interface. This is due to the information obtained in addition to the initial metadata, e.g., information obtained in different iterations of the present method.

The first execution of step 207 may initialize the discovery space with all information available at the data source, and consisting of the data items and their initial metadata. After a further execution of step 207 (e.g., in an iteration of the present method), the discovery space may, in addition, hold all the information discovered so far together with the discovery tasks executed. Thus, the discovery space 108 provides to the user the current state of the discovery process and information on how the current state has been reached. This may, for example, allow the user to decide on the next best discovery step that may result in further discovery tasks issued to the discovery engine 101.

The rendering is performed so that an easy visualization, search, and navigation of the rendered discovery space content may be performed. For example, the rendering may be performed using a graph model and framework that provide extensibility features (e.g., attribute, edge and node extensibilities in addition to a functional extensibility, such as metering and scoring functions) as needed by the various graph operations.

Step 207 may make all extracted metadata available to the user via the search and navigation interface of the discovery space 108.

The rendered content may be used in step 209 for determining a set of one or more tasks for generating further metadata from at least part of the data of the data source in accordance with the data exploration request, wherein the set of tasks comprises a combination of API calls of the API of the discovery engine 101. The combination of API calls represents a discovery strategy. The discovery strategy may indicate which data analysis or data processing are to be performed on data of the data source. In one example, the discovery strategy may further indicate how the data would be accessed in order to perform the data analysis.

The discovery strategy may be determined by the user and/or automatically be determined by the discovery manager 107. The user may define at least part of the combination of API calls based on what is displayed in the discovery space 108. In addition, or alternatively, step 209 may automatically be performed. For that, a strategy pool may be used. The strategy pool may comprise an association or mapping between discovery strategies and corresponding data descriptive metadata.

The strategy pool may, for example, comprise the following table:

| Strategy | data descriptive metadata |
|---|---|
| Strategy1: MLTA API call, schema1 API call. | FracTable: 92% NsmallTables: 10K NmetaTypes: 1 |
| Strategy 2: CLAS API call, schema2 API call. | FracTable: 7% NsmallTables: 50K NmetaTypes: — |
| Strategy 3 | FracTable: 5% NsmallTables: 20K NmetaTypes: 30 |

The attribute FracTable refers to the fraction of tables that have metadata in data to be discovered. The attribute NsmallTables refers to the number of small tables in data to be discovered. The attribute NmetaTypes refers to the different types of metadata, e.g., it indicates the heterogeneity of the metadata in data to be discovered. The strategy column provides different discovery strategies. Each strategy of the different discovery strategies may comprise API calls. For example, MLTA API call indicates the use of an API call of the API of the discovery engine to execute the ML based term assignment algorithms. In another example, the schema1 API call indicates the use of an API call to perform the ML based term assignment algorithms on 5% of the uninvestigated tables with the smallest number of columns and determine term assignments for them. In yet another example, CLAS API call indicates the use of an API call of the API of the discovery engine to execute data classification algorithms. In yet another example, the schema2 API call indicates the use of an API call to perform the classification algorithms on smaller tables first followed by larger tables. The data descriptive metadata may, for example, further indicate values of at least part of the status parameters of data discovery status, e.g., different strategies may be chosen depending on the percentage of processed or covered data. The automatically determined strategies may, in one example, be automatically executed or may, in another example, be executed after a confirmation by the user.

Following the churn analysis example, the present method may, for example, recommend or determine Strategy 1 for databases D1 to D40 due to the rich metadata available for databases D1 to D40, Strategy 2 for databases D41 to D47 due to the sparse metadata available for databases D41 to D47, and Strategy 3 for databases D48 to D50 due to the heterogeneous metadata available for databases D48 to D50.

In step 211, the API calls may be issued to the discovery engine 101. The API calls may be issued by the discovery manager 107.

In step 213, discovery results of the issued API calls may be received at the discovery manager 107. The discovery results comprise further metadata of the data of the data source 106. Following the churn analysis example, the discovery results may comprise certain term assignments and classifications as obtained by the execution of the two strategies: Strategy 1 and Strategy 2. The discovery results may further comprise additional attributes that are generated from contents of the data items of the data source. The discovery results may further comprise new data to be discovered (e.g. discovered tables, schemata or databases) that may not be part of the data source indicated in the data exploration request and that may be useful for the discovery goal. The discovery results may comprise metadata of these discovered tables.

In step 215, a data discovery status may be evaluated using the discovery results. The data discovery status may, for example, comprise values of status parameters. In one example, a status parameter of the status parameters may comprise an amount of data that fulfills the data exploration request. In one example, a status parameter of the status parameters may comprise a number of distinct data types of data that fulfill the data exploration request. In one example, a status parameter of the status parameters may comprise a score for a discovery goal achievement. In one example, a status parameter of the status parameters may comprise a percentage of covered/processed data and/or percentage unprocessed data. In one example, a status parameter of the status parameters may comprise an accumulated resource overhead value: time, storage, CPU etc.

The discovery space content may be augmented in step 217 using the further metadata and the data discovery status. For example, additional information is added to the current discovery space content. In addition, the current discovery space content may be updated based on the acquired results.

The information contained in the discovery results may be used to fill and/or update the values of the discovery attributes. In addition, other metadata or computed scores such as percentage of processed data items, accumulated resource overhead, goal fulfillment, etc. may be refreshed.

It may be determined in inquiry step 219 if the data discovery status fulfills a discovery stopping criterion. If the data discovery status does not fulfill the discovery stopping criterion, steps 207 through 219 may be repeated, e.g., in order to get further insights or metadata from additional data to be discovered, e.g., from data indicated in the discovery results and/or data of the data source which are not yet discovered. Steps 207-219 may be referred to as an enrichment phase. For example, based on accumulated data and computed scores (indicated in the data discovery status), the discovery manager may recommend to further iterate or to stop the discovery, and the user may accept or overwrite. The rendering of the data discovery status may be performed using progress bars. For example, a progress bar may indicate current values of each status parameter of the data discovery status, e.g., a progress bar may indicate the percentage of covered or processed data.

Figure 3:
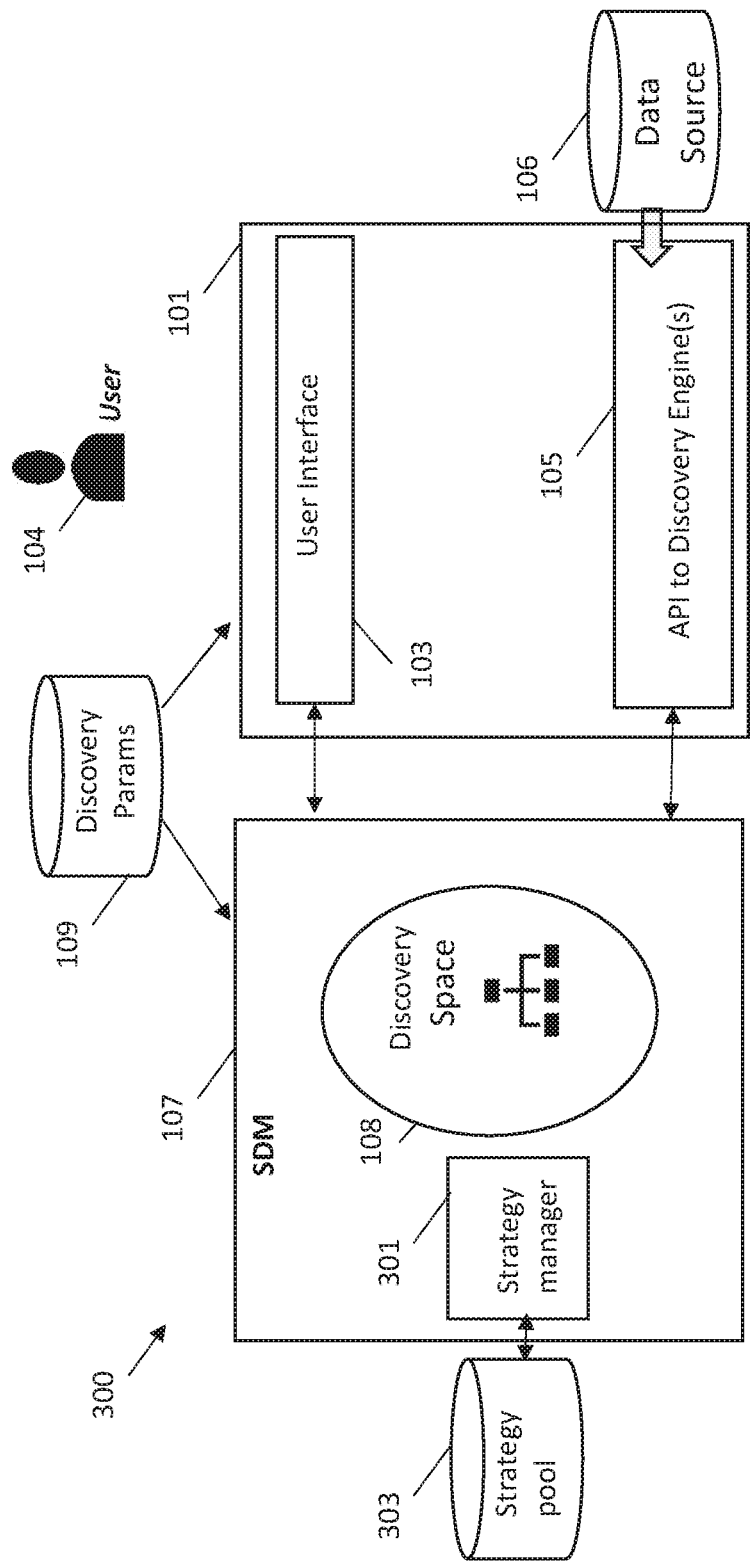
FIG. 3 is a block diagram of a computer system in accordance with an example of the present subject matter.

FIG. 3 is a block diagram of a computer system 300 in accordance with an example of the present subject matter.

The computer system 300 of FIG. 3 comprises all elements of FIG. 1. In addition, the discovery manager 107 comprises a strategy manager 301 and a strategy pool 303. The strategy manager 301 is configured to 'oversee'/access the whole discovery space 108 to exploit all so far available information and to recommend based on the given discovery strategy the next best discovery action to the user 104. The strategy manager 301 extends the discovery manager 107 by a discovery strategy that enables a data-driven exploration in combination to a user-driven exploration. The strategy manager 301 may for example be used in step 209 to determine the strategies.

The computer system 300 may be advantageous as the user may receive a recommendation on the discovery process, an externalization of the currently active as well as applicable discovery strategies in the discovery space 108 as well as useful information on the level of fulfillment of the discovery goal. By exploitation of the information in the discovery space 108 the discovery strategy is enabled to react to the current state, thus determining the next best discovery step and recommending this to the user. This may lead to an overall effective discovery process due to goal achievement or fulfillment level. The computer system 300 enables the user to receive valuable information: recommendations out of a proven practically relevant discovery strategy level of fulfillment according to the discovery goal that enable the user to execute an efficient discovery process. Efficiency in this respect means minimization of the amount of consumed resources. This is achievable because only selected and beneficial discovery steps are executed instead of performing all possible ones as in a brute force approach. This may also result in reduced compute and storage requirements and less spending in time.

Figure 4:
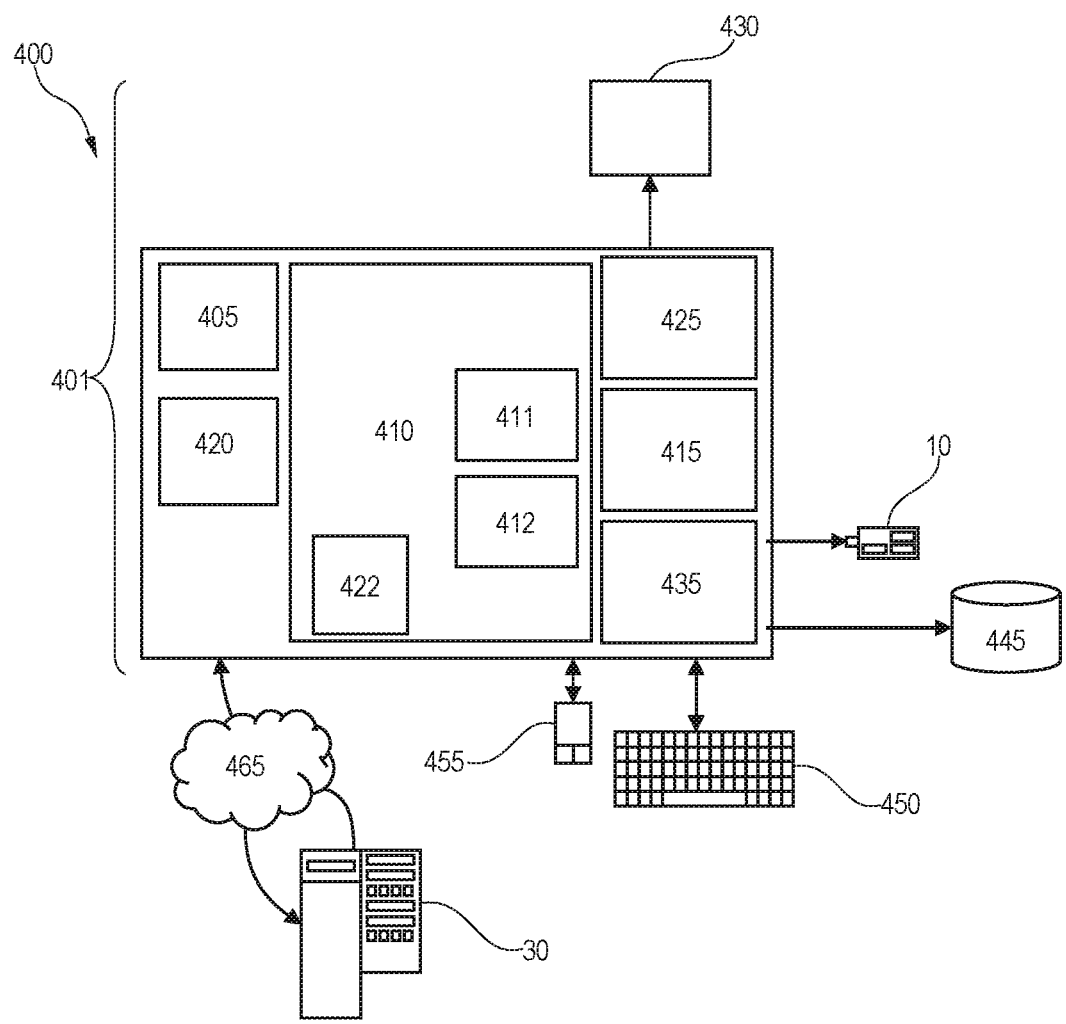
FIG. 4 represents a computerized system, suited for implementing one or more method steps as involved in the present disclosure.

FIG. 4 represents a general computerized system 400 such as the discovery manager suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 412, 422 (including firmware 422), hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 410 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes instructions 412, e.g., instructions to manage databases such as a database management system. The software in memory 410 shall also typically include a suitable operating system (OS) 411. The OS 411 essentially controls the execution of other computer programs, such as possibly software 412 for implementing methods as described herein.

The methods described herein may be in the form of a source program 412, executable program 412 (object code), script, or any other entity comprising a set of instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object-oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part, or all of the steps of the methods discussed herein. In exemplary embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) 422. The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for accessing data of one or more data sources using a discovery engine, the discovery engine providing application programming interfaces, APIs, for processing data of the data sources, the method comprising:
receiving a data exploration request indicative of a data source;
determining initial metadata descriptive of properties of data of the data source;
determining a discovery space content from the initial metadata, the discovery space content comprising values of predefined discovery attributes, the discovery attributes comprising at least semantic attributes representing semantic information of data and attributes describing a type and amount of data;
performing enrichment operations comprising:
rendering the discovery space content;
using the rendered content for determining a set of one or more tasks for generating further metadata from at least part of the data of the data source in accordance with the data exploration request, wherein the set of tasks comprises a combination of API calls of the APIs;
issuing the API calls of the set of tasks;
receiving discovery results of the issued API calls, the discovery results comprising further metadata of the data of the data source;
evaluating a data discovery status using the discovery results, the data discovery status indicating at least an amount of data that fulfills the data exploration request;
augmenting the discovery space content using the further metadata and the data discovery status; and
repeating the enrichment operations until the data discovery status fulfills a discovery stopping criterion.

2. The method of claim 1, wherein the determining of the set of tasks comprises:
receiving user selected API calls; and
automatically selecting API calls, wherein the combination of the API calls comprises the user selected API calls or automatically selected API calls.

3. The method of claim 2, further comprising:
providing a pool of strategies in association with data descriptive metadata, each strategy of the strategies comprising API calls; and
performing the automatic selection by querying the pool of strategies using the rendered discovery space content.

4. The method of claim 3, wherein the data descriptive metadata comprises:
a fraction of tables that have metadata; and
a number of types of metadata.

5. The method of claim 1, wherein determining the initial metadata comprises:
gathering existing metadata of the data source from catalogs of the data source; or
performing one or more metadata generation methods on the data of the data source.

6. The method of claim 5, wherein the metadata generation methods comprises a shallow profiling, shallow domain recognition, or shallow data quality analysis.

7. The method of claim 1, wherein the stopping criterion requires one of:
the amount of data being smaller than a predefined minimum threshold; and
the amount of data being larger than a predefined maximum threshold.

8. The method of claim 7, wherein the data discovery status being evaluated uses a number of distinct data types of data that fulfill the data exploration request, the stopping criterion requiring one of:
the number of distinct data types being smaller than a predefined minimum number; and
the number of distinct data types being higher than a predefined maximum number.

9. The method of claim 1, wherein a discovery manager is connected to the discovery engine and the rendering of the discovery space content is performed on a user interface of the discovery manager, and wherein the data exploration request is received at a user interface of the discovery engine.

10. The method of claim 1, wherein the rendering of the discovery space content comprises rendering a progress bar indicative of the data discovery status.

11. The method of claim 1, further comprising: in response to the discovery stopping criterion being fulfilled, retrieving data that fulfils the data exploration request at a local system and processing the retrieved data at the local system.

12. A computer system for accessing data of one or more data sources using a discovery engine, the discovery engine providing application programming interfaces, APIs, for processing data of the data sources, the computer system being configured for:
receiving a data exploration request indicative of a data source;
determining initial metadata descriptive of properties of data of the data source;
determining a discovery space content from the initial metadata, the discovery space content comprising values of predefined discovery attributes, the discovery attributes comprising at least semantic attributes representing semantic information of data and attributes describing a type and amount of data;
performing enrichment operations comprising:
rendering the discovery space content;
using the rendered content for determining a set of one or more tasks for generating further metadata from at least part of the data of the data source in accordance with the data exploration request, wherein the set of tasks comprises a combination of API calls of the APIs;
issuing the API calls of the set of tasks;
receiving discovery results of the issued API calls, the discovery results comprising further metadata of the data of the data source;
evaluating a data discovery status using the discovery results, the data discovery status indicating at least an amount of data that fulfills the data exploration request;
augmenting the discovery space content using the further metadata and the data discovery status; and
repeating the enrichment operations until the data discovery status fulfills a discovery stopping criterion.

13. The computer system of claim 12, wherein the computer system is further configured for:
providing a pool of strategies in association with data descriptive metadata, each strategy of the strategies comprising API calls; and
performing the automatic selection by querying the pool using the rendered discovery space content.

14. The computer system of claim 13, wherein the data descriptive metadata comprises:
a fraction of tables that have metadata; and
a number of types of metadata.

15. The computer system of claim 12, wherein determining the initial metadata comprises:
gathering existing metadata of the data source from catalogs of the data source; or
performing one or more metadata generation methods on the data of the data source.

16. The computer system of claim 15, wherein the metadata generation methods comprises a shallow profiling, shallow domain recognition, or shallow data quality analysis.

17. The computer system of claim 12, comprising the discovery engine.

18. The computer system of claim 12, wherein the determining of the set of tasks comprises:
receiving user selected API calls; and
automatically selecting API calls; wherein the combination of the API calls comprises the user selected API calls or automatically selected API calls.

19. The computer system of claim 12, wherein the stopping criterion requires one of:
the amount of data being smaller than a predefined minimum threshold; and
the amount of data being larger than a predefined maximum threshold.

20. A computer program product comprising a computer-readable storage medium having computer-readable program code embodied therewith, the computer-readable program code configured to implement a method comprising:
receiving a data exploration request indicative of a data source;
determining initial metadata descriptive of properties of data of the data source;
determining a discovery space content from the initial metadata, the discovery space content comprising values of predefined discovery attributes, the discovery attributes comprising at least semantic attributes representing semantic information of data and attributes describing a type and amount of data;
performing enrichment operations comprising:
rendering the discovery space content;
using the rendered content for determining a set of one or more tasks for generating further metadata from at least part of the data of the data source in accordance with the data exploration request, wherein the set of tasks comprises a combination of API calls of the APIs;
issuing the API calls of the set of tasks;
receiving discovery results of the issued API calls, the discovery results comprising further metadata of the data of the data source;
evaluating a data discovery status using the discovery results, the data discovery status indicating at least an amount of data that fulfills the data exploration request;
augmenting the discovery space content using the further metadata and the data discovery status; and
repeating the enrichment operations until the data discovery status fulfills a discovery stopping criterion.

* * * * *